United States Patent [19]
Tanaka

[11] Patent Number: 5,903,665
[45] Date of Patent: May 11, 1999

[54] IMAGE PROCESSING APPARATUS

[75] Inventor: Tatsuya Tanaka, Yamatokoriyama, Japan

[73] Assignee: Sharp Kabushiki Kaisha, Osaka, Japan

[21] Appl. No.: 08/739,933

[22] Filed: Oct. 30, 1996

[30]     Foreign Application Priority Data

Nov. 1, 1995  [JP]  Japan ..................................... 7-284990

[51] Int. Cl.$^6$ ..................................................... G06K 9/00
[52] U.S. Cl. ........................................................... 382/162
[58] Field of Search ................................... 382/162, 167, 382/157; 358/539, 520

[56]              References Cited

FOREIGN PATENT DOCUMENTS

6-101854  of 1994  Japan ................................ H04N 9/79

Primary Examiner—Amelia Au
Assistant Examiner—Samir Ahmed
Attorney, Agent, or Firm—Dike, Bronstein, Roberts & Cushman; David G. Conlin

[57]             ABSTRACT

In an image processing apparatus of the present invention, a chromaticity data converting device converts chromaticity data of an original image into chromaticity data which can be outputted from an image output device based on chromaticity data obtained from a color signal of a color sample stored in a first storage device and chromaticity data obtained from a color signal of an input image stored in an original data storage device. Then, a second color converting device converts the chromaticity data converted by the chromaticity data converting device into a signal which can be outputted from the image output device based on data stored in a third storage device. As a result, the chromaticity data of a color signal is converted for each input image individually, thereby making it possible to reproduce colors faithfully to the original image.

18 Claims, 8 Drawing Sheets

IMAGE PROCESSING APPARATUS

FIELD OF THE INVENTION

The present invention relates to an image processing apparatus, and more particularly, to a digital image processing apparatus, such as a digital color copying machine and a system in which a readout image from an image input device (scanner or the like) is printed out by an image output device (color printer or the like).

BACKGROUND OF THE INVENTION

Figure 10:
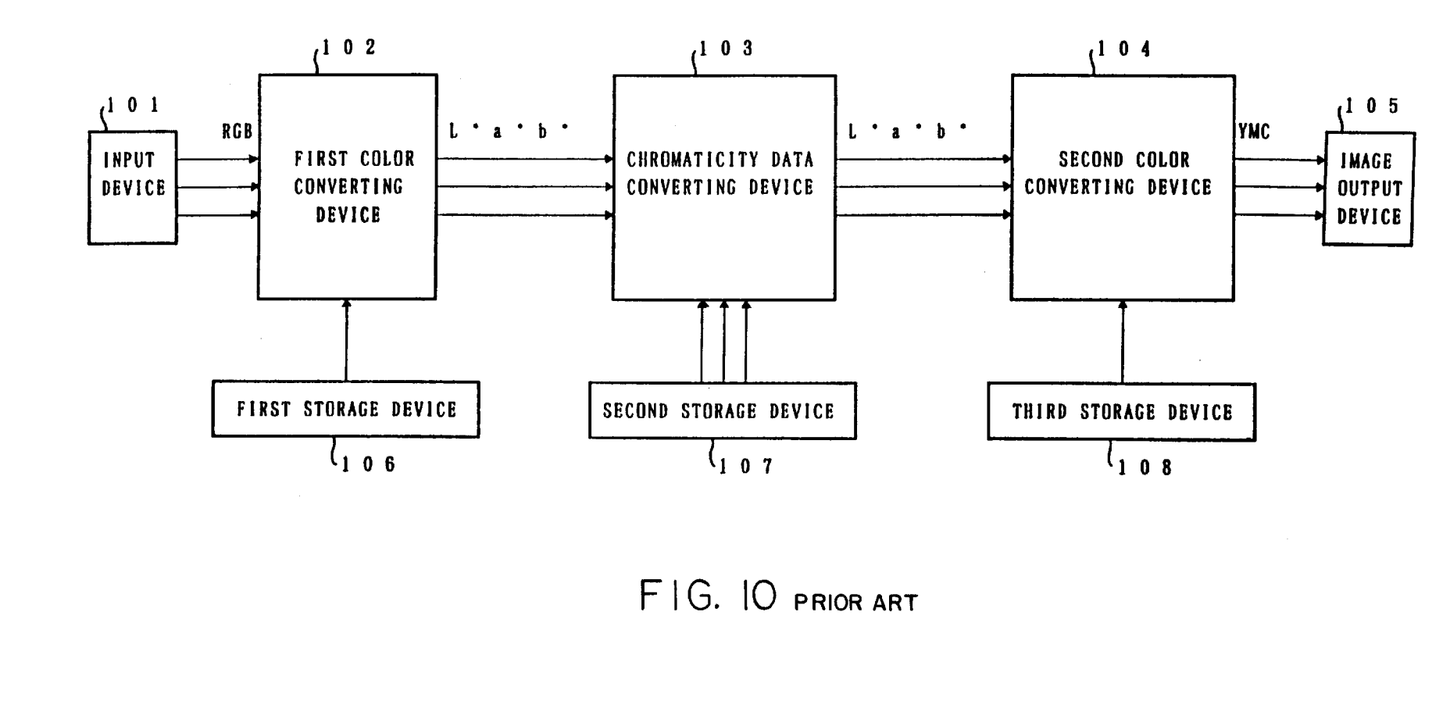
FIG. 10 is a block diagram schematically showing a conventional image processing apparatus.

As shown in FIG. 10, in a conventional image processing apparatus, such as a digital color copying machine, a color original image is read out by an input device 101, such as a scanner, and the readout image data are separated into three color signals: R(Red), G(Green), and B(blue) (which is collectively referred to as RGB signal hereinafter). Then, the resulting RGB signal is outputted to a first color converting device 102.

The first color converting device 102 carries out color converting processing, that is to say, it converts the RGB signal to chromaticity data based on data pre-stored in a first storage device 106 using Equation (1) below. Equation (1) is a polynomial color converting matrix (MTX) having linear terms and non-linear terms. Note that a coefficient (MTX) used in the color converting matrix is pre-stored in the first storage device 106.

$$\begin{bmatrix} L^* \\ a^* \\ b^* \end{bmatrix} = [MTX] \begin{bmatrix} R \\ G \\ B \end{bmatrix} + \begin{bmatrix} k_1 \\ k_2 \\ k_3 \end{bmatrix} \quad (1)$$

where MTX is a coefficient of the matrix, and $k_i$ (i=1,2,3) is a constant number.

Equation (1) is introduced by, for example, a multiple regression model, by which an input RGB color separation signal of a color sample is used as an input and converted into an L* a* b* value, or desirable chromaticity data. The L* a* b* value referred herein is a value representing one of color specification systems in the homogeneous color space adopted by Commission Internatinale de l'Eclairage (CIE) in 1976.

Next, the chromaticity data (L* a* b* value ) from the first color converting device 102 are inputted into a chromaticity data converting device 103, which compresses a color gamut of the input chromaticity data using chromaticity data pre-stored in a second storage device 107. The chromaticity data pre-stored in the second storage device 107 are chromaticity data of a color reproducible region of an image output device 105, such as a printer, and chromaticity data of a color reproducible region of the input device 101, such as a scanner. An example method of compressing a color gamut is disclosed in Japanese Examined Patent Publication No. 101854/1994 (Tokukouhei 6-101854).

Next, the chromaticity data whose color gamut has been compressed by the chromaticity data converting device 103 are inputted into a second color converting device 104. The second color converting device 104 converts the input chromaticity data into a color signal (YMC) which can be outputted from the image output device 105 based on data pre-stored in a third storage device 108.

That is to say, the second color converting device 104 converts the chromaticity data into desirable YMC based on the data pre-stored in the third storage device 108. To be more specific, like the first color converting device 102, the second color converting device 104 finds a polynomial color converting matrix such that yields desirable YMC based on input data, namely, the L* a* b* value of the color sample of the output device 105, and carries out the color converting processing using the color converting matrix thus found. Therefore, the data pre-stored in the third storage 108 are the coefficient (MTX) used in the color converting matrix.

Next, the color signal from the second color converting device 104 is inputted into the image output device 105, which in turn outputs a copy image of the original image based on the input color signal.

Incidentally, in the conventional image processing apparatus, the chromaticity data converting device 103 compresses the color gamut of all the chromaticity data converted by the first color converting device 102 using the chromaticity data of the color reproducible region of the image output device 105 and the chromaticity data of the color reproducible region of the input device 101. For this reason, the conventional image processing apparatus causes three major problems as follow.

(I) When the input chromaticity data of the original image are converted using the chromaticity data of the reproducible regions of both the output device 105 and input device 101, the input chromaticity data are always processed by the same method. Thus, in some cases, the input image data of an original image may not be processed properly to produce a copy image corresponding to the original image.

(II) Even when the chromaticity data of the original image are within the color reproducible region of the image output device 105, once such chromaticity data are inputted into the chromaticity data converting device 103, the chromaticity data converting device 103 compresses the color gamut of the same unnecessarily. Thus, the saturation of the chromaticity data is lowered more than necessary, and the resulting output image loses brightness.

(III) When the chromaticity data of the original image are out of the color reproducible region of the image output device 105, the color gamut of the same may not be compressed within the color reproducible region of the image output device 105. In such a case, the resulting copy image may not correspond to the original image.

SUMMARY OF THE INVENTION

It is therefore an object of the present invention to provide an image processing apparatus capable of producing a copy image corresponding to an original image by compressing a color gamut of each input image separately.

To fulfill the above object, an image processing apparatus of the present invention for processing a first color signal produced by means of an image input device based on an image data of a color original image to output a color copy image from an image output device, the image processing apparatus is further provided with:

a pre-scanning device for pulling in the image data of the original image by skipping every other scanning line to produce a second color signal, a first color converting device for converting the first and second color signals into first and second chromaticity data, respectively, a storage device for storing third chromaticity data of a color reproducible region of the image output device, an original data storage device for storing the second chromaticity data, a chromaticity data converting device for converting the first chromaticity data into fourth chromaticity data which can be outputted from the image output device, the above conversion being carried out based on the third chromaticity data stored in the storage device and the second chromaticity data stored in the original data storage device, and a second color converting device for converting the fourth chromaticity data into a signal which can be outputted from the image output device.

According to the above structure, the chromaticity data converting device converts the chromaticity data of the original image into the fourth chromaticity data which can be outputted from the image output device based on the third chromaticity data of the color reproducible region of the image output device stored in the storage device and the second chromaticity data of the input image stored in the original data storage device. As a result, the chromaticity data can be converted for each input image individually.

In other words, since the above chromaticity data converting device makes it possible to convert the chromaticity data for each input image, the resulting image corresponds to the input image more accurately, in other words, the resulting image is more faithful to the original image, compared with a conventional image processing apparatus which converts the chromaticity data of the original image based on the chromaticity data of the color reproducible regions of both the image output device and the input device.

It is preferable to arrange the above image processing apparatus in such a manner to judge whether the chromaticity data of the input image are within the color reproducible region of the image output device or not, so that the chromaticity data are converted into those within the reproducible region of the image output device by different converting methods depending on whether the chromaticity data are within the color reproducible region of the image output device or not, thereby making it possible to produce a copy image more faithful to the original image.

For a fuller understanding of the nature and advantages of the invention, reference should be made to the ensuing detailed description taken in conjunction with the accompanying drawings.

BRIEF DESCRIPTION OF THE DRAWINGS

FIGS. 4(a) and 4(b) are views explaining another example color converting method by the first color converting device of the image processing apparatus of FIG. 1.

DESCRIPTION OF THE EMBODIMENTS

Referring to FIGS. 1 through 9, the following description will describe an example embodiment of the present invention. Note that the L* a* b* color space, one of the color specification systems in the homogeneous color space adopted by Commission Internationale de l'Eclairage (CIE) in 1976, is used as the chromaticity data in the present embodiment.

Figure 1:
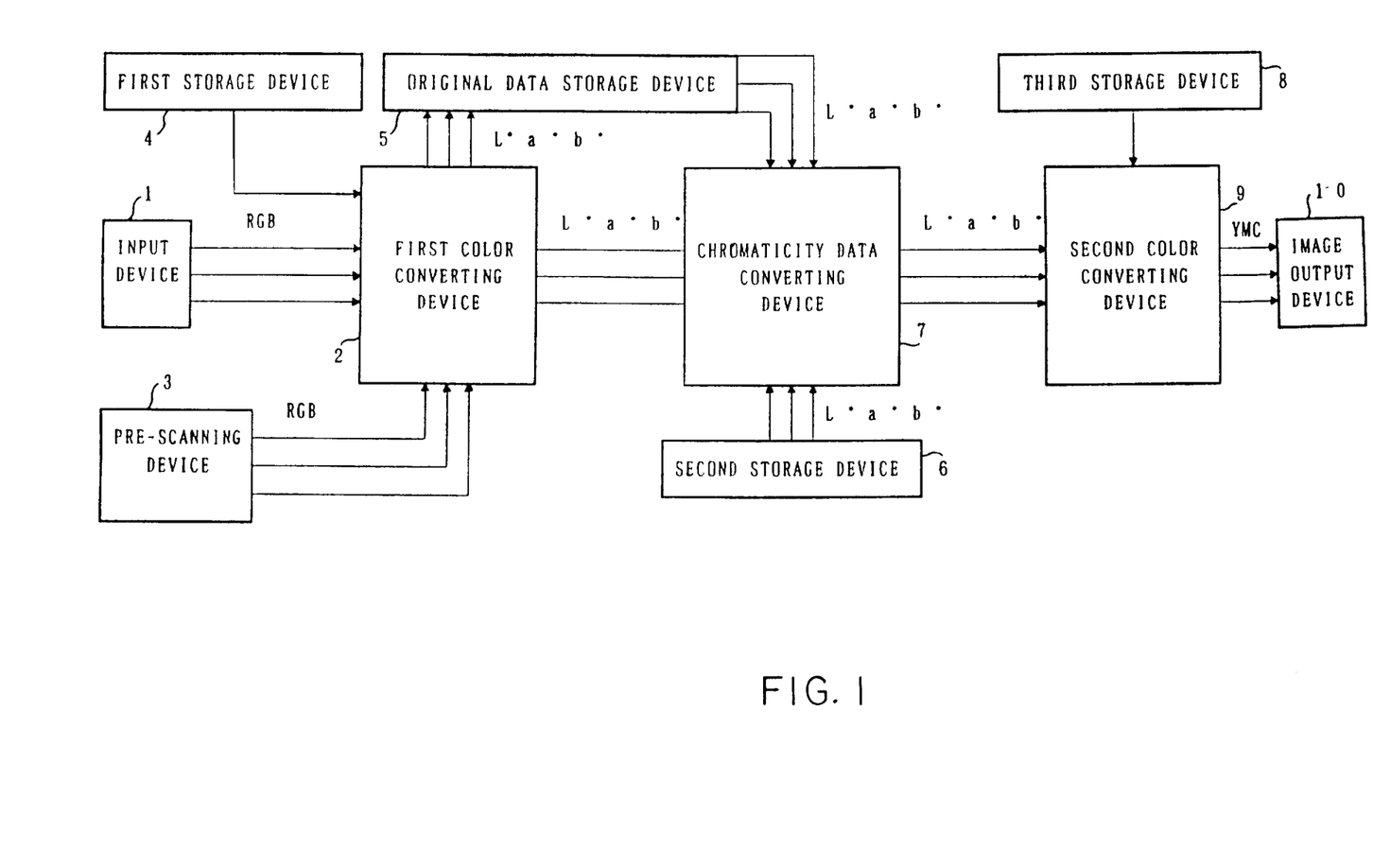
FIG. 1 is a block diagram schematically showing an image processing apparatus in accordance with an example embodiment of the present invention.

The image processing apparatus of the present embodiment is used as a digital color copying machine and the like, and as shown in FIG. 1, the image processing apparatus comprises an input device 1 serving as image input means, a first color converting device 2 serving as first color converting means, a pre-scanning device 3 serving as pre-scanning means, a first storage device 4, an original data storage device 5 serving as original image data storage means, a second storage device 6, a chromaticity converting device 7 serving as chromaticity converting means, a third storage device 8 serving as storage means, a second color converting device 9 serving as second color converting means, and an image output device 10.

The input device 1 is composed of a scanner or the like, and reads out a color original image (hereinafter, referred to as original image). Further, the input device 1 separates the readout image data into three colors—R(Red), G(Green), and B(Blue)—to produce three color signals (hereinafter, collectively referred to as RGB signal), which are inputted into the first color converting device 2.

The first color converting device 2 converts the input RGB signal into chromaticity data (L* a* b* value of CIE) based on the data pre-stored in the first storage device 4 by the matrix method, 3-D look-up table method, neural network method, etc, which will be described below. Thus, the first storage device 4 stores the data necessary for the specific method carried out by the first color converting device 2. More specifically, the first storage device 4 stores the data specified below in each method to obtain desirable YMC:

| METHOD | STORED DATA |
| --- | --- |
| matrix | polynomial color converting matrix |
| 3-D look-up table | coordinate of the vertex of each unit cube |
| neural network | learned linking strength |

The pre-scanning device 3 pulls in the image data of the original image while skipping every other scanning line before the input device 1 pulls in the original image. The pre-scanning device 3 and input device 1 may be separate members. However, since both the pre-scanning device 3 and input device 1 scan the same original image, it is preferable to arrange that the input device 1 can also serve as the pre-scanning device 3 to save a space or the like. In this case, the input device 1 can be switched by unillustrated control means to operate as the image scanning means for scanning the original image or the pre-scanning means for pre-scanning the original image.

Like the input device 1, the pre-scanning device 3 separates the pre-scanned image data into the RGB signal, which is inputted into the first color converting device 2 and converted into the chromaticity data (L* a* b* value). The chromaticity data thus produced are outputted to the image data storage device 5 and stored therein. That is to say, the image data storage device 5 stores all the chromaticity data related to the original image.

The chromaticity data converting device 7 receives the chromaticity data (L* a* b* value) from the first color converting device 2, and compresses the color gamut of the same in the direction of an achromatic color using the chromaticity data stored in the original data storage device 5 and the chromaticity data of the color reproducible region of the image output device 10 stored in the second storage device 6. Note that the color gamut is compressed by any of three methods described below.

The second color converting device 9 receives the compressed chromaticity data from the chromaticity data converting device 7, and converts the same into a color signal (YMC) which can be outputted from the image output device 10 based on the data pre-stored in the third storage device 8. In the present embodiment, the chromaticity data are converted into the YMC, or a color signal which can be outputted from the output device 10; however, the chromaticity data may be converted into YMCK or the like depending on the structure of the image output device 10. The data stored in the third storage device 8 will be detailed below.

The second color converting device 9 converts the chromaticity data in the same manner as the first color converting device 2, that is, by the matrix method, 3-D look-up table method, neural network method, etc. Also, like the first storage device 4, the third storage device 8 stores the data necessary for the specific method the second color converting device 9 carries out, that is, the data obtained based on the input data, namely, the CIE L* a* b* value of the color sample of the image output device 10.

The first color converting device 2, pre-scanning device 3, first storage device 4, original data storage device 5, second storage device 6, chromaticity data converting device 7, third storage device 8, and second color converting device 9 form color signal processing means for converting a color signal from the image input device 1 into a signal which can be outputted from the image output device 10.

The image output device 10 is composed of a color printer or the like, and outputs a copy image of the original image upon receipt of the color signal (YMC) from the second color converting device 9. Note that the input color signal (YMC) is within the color reproducible region of the image output device 10.

For further understanding, three major color converting methods—the matrix method, 3-D look-up table method, and neural network method—carried out by the first color converting device 2 and second color converting device 9 will be explained in the following with reference to FIGS. 2 through 5.

(I) Matrix Method

In the matrix method, the color converting processing is carried out by running an operation using a polynomial having linear terms and non-linear terms expressed by Equation (2):

$$\begin{bmatrix} L^* \\ a^* \\ b^* \end{bmatrix} = [MTX] \begin{bmatrix} R \\ G \\ B \end{bmatrix} + \begin{bmatrix} k_1 \\ k_2 \\ k_3 \end{bmatrix} \quad (2)$$

where MTX is a coefficient of the matrix, and $k_i$ (i=1,2,3) is a constant number.

Equation (2) is introduced by, for example, a multiple regression model, by which an input RGB color separation signal of a color sample is used as an input and converted into an L* a* b* value, or desirable chromaticity data. To be more specific, for example, a color patch of 9×9×9=729 colors is prepared as a color sample and the chromaticity data (L* a* b* value) of each color are measured by a color measuring instrument. Then, the color patch is read out by the input device 1 to obtain a color separation signal, such as a RGB signal. The color converting matrix is computed based on the above chromaticity data and color separation signal of the color sample, which are stored in the first storage device 4.

In short, in the matrix method, the RGB signal from the input device 1 is converted into the chromaticity data (L* a* b* value) using the polynomial color converting matrix pre-stored in the first storage device 4.

In this method, the RGB signal is converted into the chromaticity data by running the operation using the color converting matrix each time the RGB signal is inputted. This arrangement not only makes it unnecessary to pre-store the chromaticity data corresponding to the RGB signal in the storage means, but also omits a time required to retrieve the desired chromaticity data from a plurality pieces of the chromaticity data pre-stored in the storage means. Therefore, the matrix method is advantageous in that the first converting device 2 can accelerate the converting processing.

(II) 3-D Look-up Table Method

Figure 2:
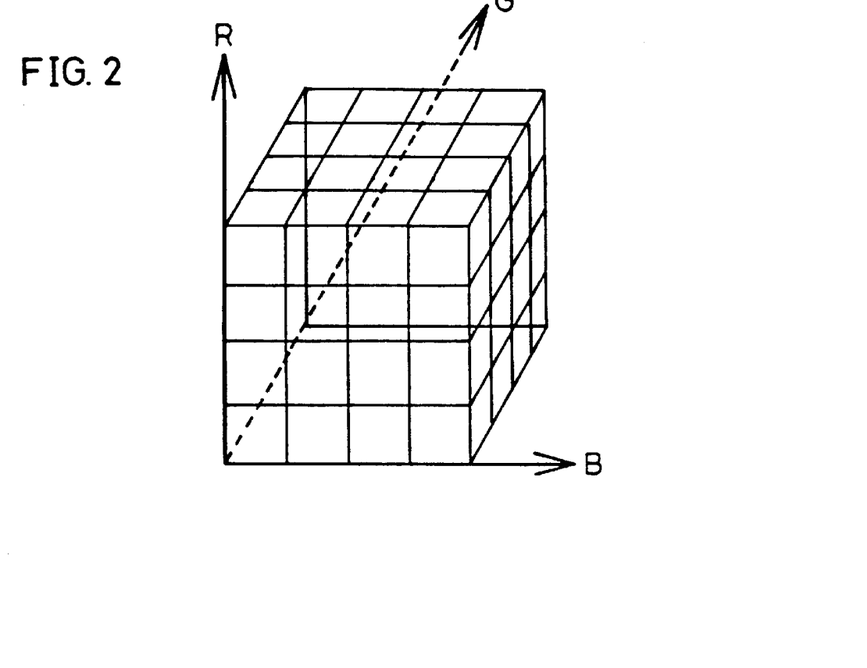
FIG. 2 is a view explaining an example color converting method by a first color converting device of the image processing apparatus of FIG. 1.

In the 3-D look-up table method, the color separation signal is produced and the chromaticity data are measured based on the RGB color sample in the same manner as the matrix method. Then, as shown in FIG. 2, the space of the resulting color separation signal is divided into a plurality of unit cubes, and the measured chromaticity data are stored in the first storage device 4 in correspondence with the coordinates of the vertexes of the unit cubes. In other words, the input RGB signal from the input device 1 is converted into the chromaticity data by mapping the space coordinates of the input RGB signal to those of the color separation signal pre-stored in the first storage device 4.

If the chromaticity data are not stored at the mapping space coordinate in the first storage device 4, the missing chromaticity data corresponding to the input data (RGB signal) are computed through a 3-D interpolation computation using the chromaticity data of the nearby space coordinates pre-stored in the first storage device 4.

Figure 3:
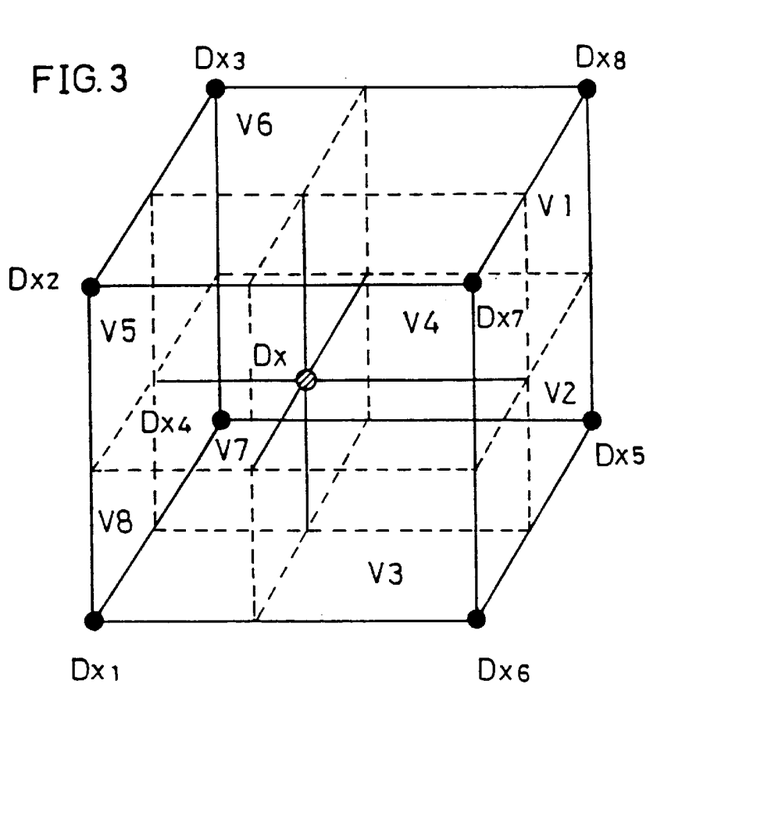
FIG. 3 is a view explaining the above example color converting method of FIG. 2 more in detail.

An example method of the 3-D interpolation computation is shown in FIG. 3. Assume that input data $D_x$ are missing in the chromaticity data within the color space, then the interpolation data are produced using eight vertexes of a unit cube to which the input data $D_x$ belong. More specifically, in the 3-D interpolation computation, the chromaticity data corresponding to the input data $D_x$ are computed using Equation (3):

$$D_x = \sum_{i=1}^{8} D_{xi} \cdot V_i / V \quad (3)$$

$$\left[ V = \sum_{i=1}^{8} V_i, \quad x = L^*, a^*, b^* \right]$$

where $D_{xi}$ is the chromaticity data at each vertex and $V_i$ is a volume of a rectangular parallelopiped at the opposing angle of each vertex.

Thus, in the 3-D look-up table method, the chromaticity data are pre-stored at the coordinates corresponding to the space coordinates of the input color signal (RGB signal), so that the chromaticity data corresponding to the input color signal, or the desired chromaticity data, can be retrieved quickly. Moreover, even when the desired chromaticity data are not stored in the matching space coordinates, the same can be computed using the chromaticity data of the nearby space coordinates.

Therefore, the 3-D look-up table method is advantageous in that the first color converting device 2 can accelerate the processing while maintaining converting accuracy.

(III) Neural Network Method

Figure 4A:
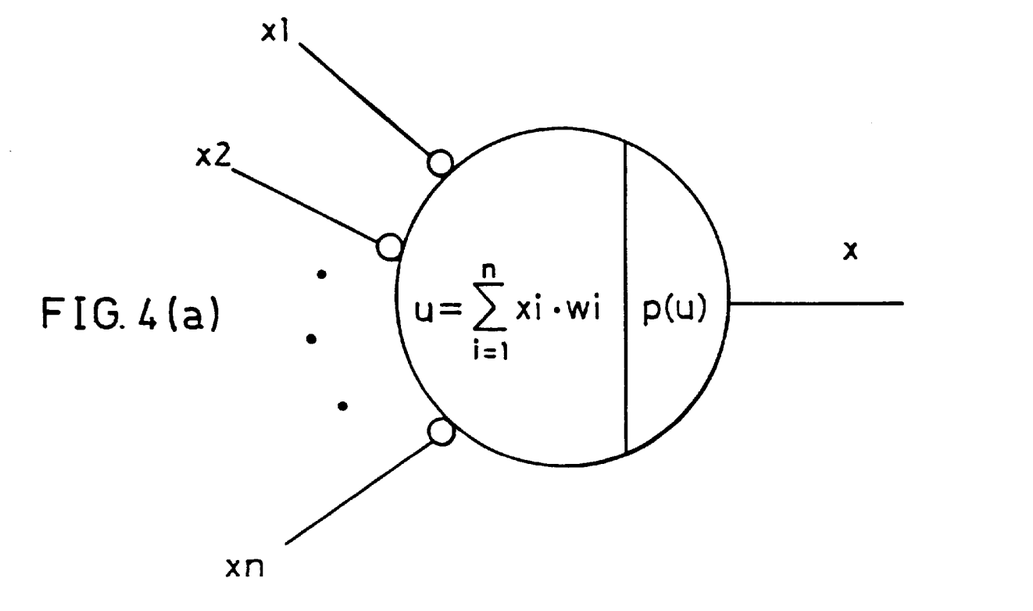
FIG. 4(a) shows a linking state between units in a neural network and FIG. 4(b) shows a graph indicating an input/output function of the neural network of FIG. 4(a)
Figure 4B:
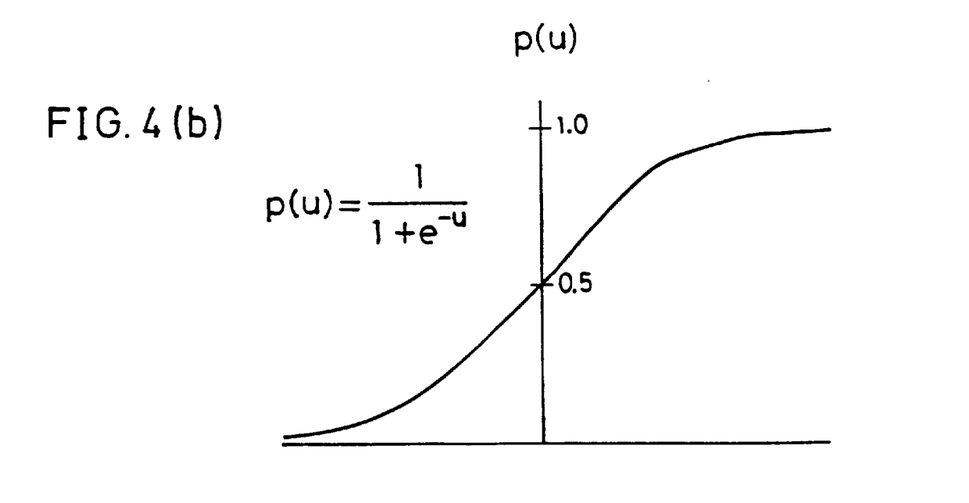

In the neural network method, as shown in FIGS. 4(a) and 4(b), a network is composed of a plurality of units interliked to each other. Each unit is a nonlinear element having a multi-input and 1-output. The operation of each unit is controlled by a signal based on the linking state of the units and the linking strength (weight coefficient wi).

Figure 5:
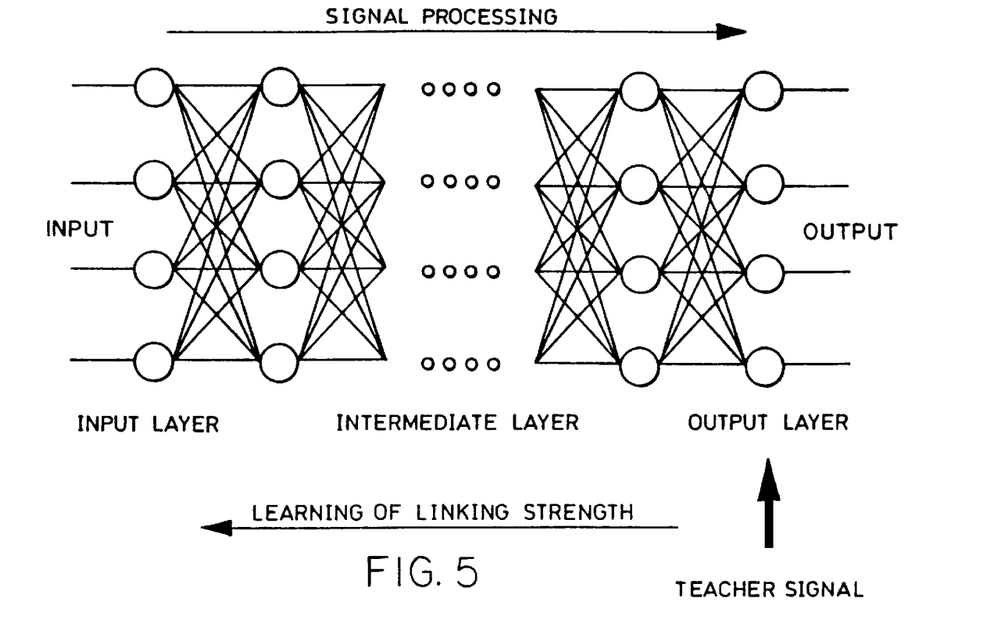
FIG. 5 is a view explaining the example color converting method of FIGS. 4(a) and 4(b) more in detail.

Examples of the neural network include the back propagation algorithm, in which, as shown in FIG. 5, the linking strength between the units in an input layer, an intermediate layer, and an output layer is learned. To be more specific, when a signal is given to the input layer, the input layer teaches a desirable output layer signal (teacher signal) to the output layer, so that the linking strength between the units is corrected to reduce an actual error between the input signal and teacher signal. Thus, the more the correction is repeated, the better the network learns, thereby enabling more accurate signal processing.

In case of the first color converting device 2 adopting the neural network method, the color separation signal computed based on the RGB color sample and the chromaticity data measured in the same manner as the matrix method are used as the input signal and teacher signal, respectively. Note that the linking strength between the units learned at this time is stored in the first storage device 4.

Thus, the neural network method is advantageous in that the accuracy in color conversion can be improved through learning, and that the volume of the data pre-stored in the storage means can be reduced because the chromaticity data are computed for each input image individually.

Examples of the color converting method are not limited to the above three methods, and other methods for converting the RGB signal into the chromaticity data are also applicable.

Next, three methods of compressing the color gamut carried out by the chromaticity data converting device 7 will be explained in the following with reference to FIGS. 6 through 9. Note that the chromaticity data converting device 7 adopts any of the three methods, and in each method, the color gamut is compressed in the direction of an achromatic color. In FIGS. 6 through 9, the chromaticity data from the first color converting device 2 are used as the input data.

(I) First Method

The first method will be explained with reference to FIGS. 6 and 7.

Figure 6:
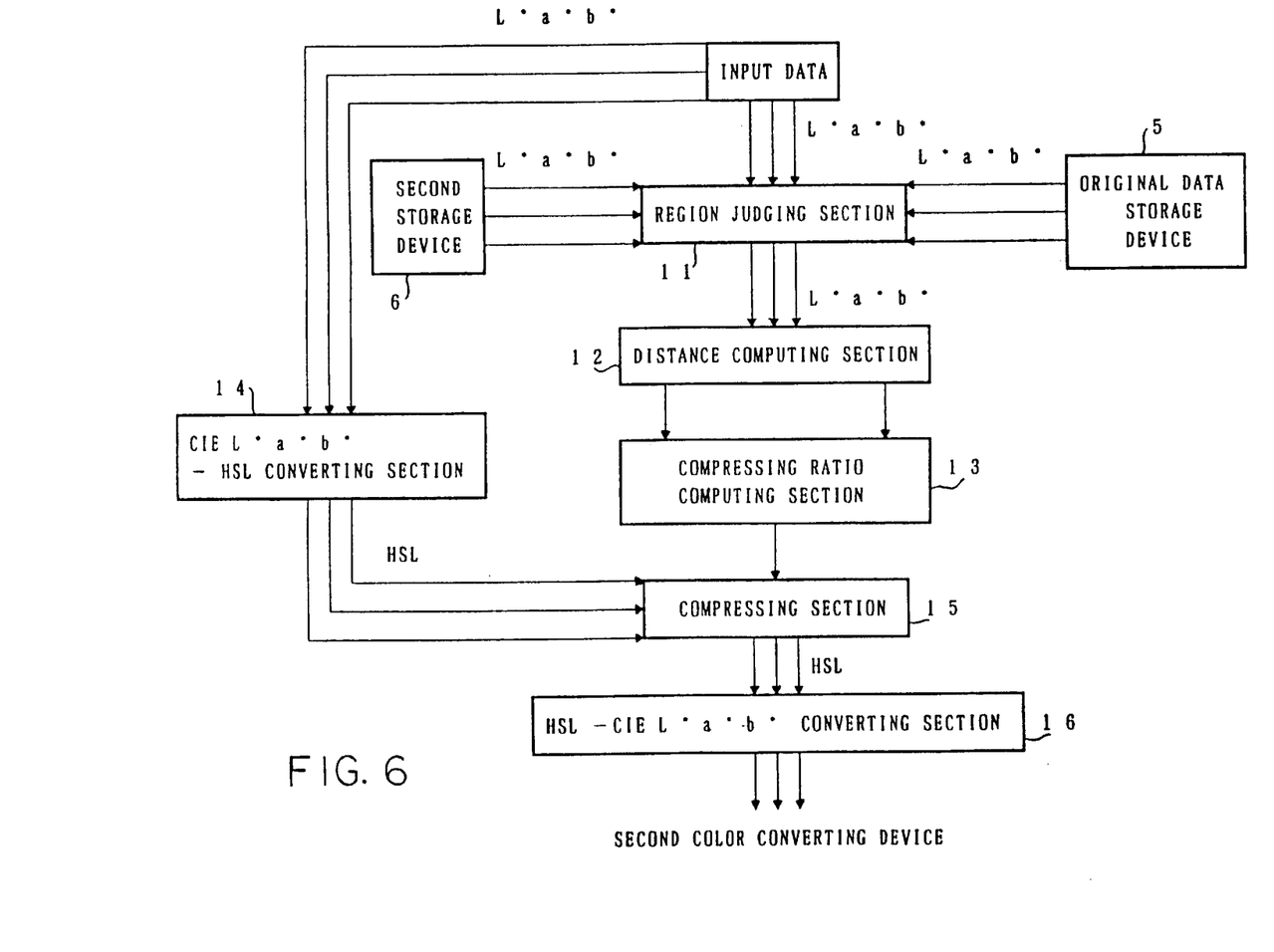
FIG. 6 is a view schematically showing an example chromaticity data converting device of the image processing apparatus of FIG. 1.

As shown in FIG. 6, the chromaticity data converting device 7 adopting the first method comprises a region judging section 11, a distance computing section 12, a compression ratio computing section 13, a CIE L* a* b*—HSL converting section 14, a compressing section 15, and an HSL—CIE L* a* b* converting section 16.

The region judging section 11 judges to which region the chromaticity data belong. To be more specific, the region judging section 11 judges to which of 6 regions—R(Red), Y(Yellow), G(Green), C(Cyan), B(Blue), and M(Magenta)—in an a* b* plane of FIG. 7, three kinds of chromaticity data specified below belong: the chromaticity data of the input data, or the input image, from the first color converting device 2; the chromaticity data in the color reproducible region of the image output device 10 stored in the second storage device 6; and the chromaticity data stored in the original data storage device 5. It is obvious from FIG. 7 that the region judging section 11 judges the a* b* value alone out of the chromaticity data (L* a* b* value).

Figure 7:
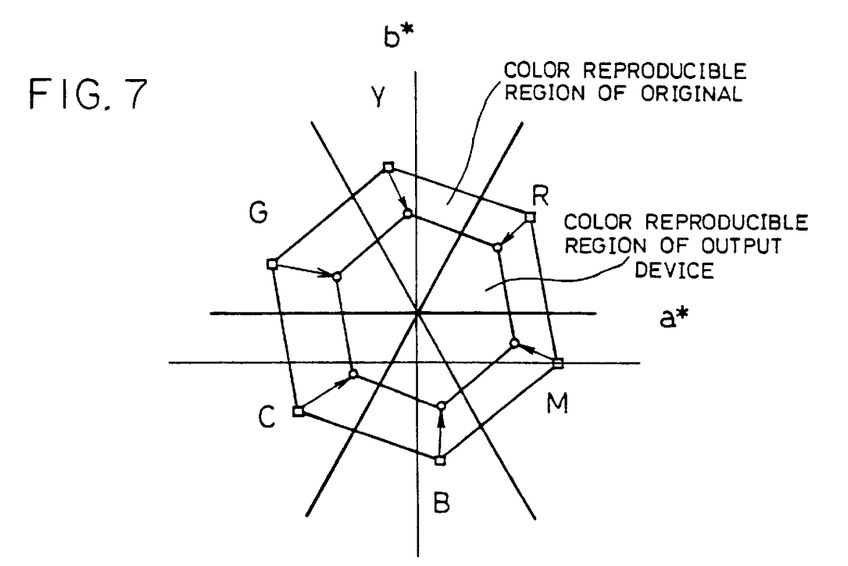
FIG. 7 shows a graph indicating regions of chromaticity data for explaining compression processing by the chromaticity data converting device of FIG. 6.

In FIG. 7, each region Hi (i=R, Y, G, C, B, and M) can be defined as follows:

R: $0 \leq H_R < \pi/3$
Y: $\pi/3 \leq H_Y < 2\pi/3$
G: $2\pi/3 \leq H_G < \pi$
C: $\pi \leq H_C < 4\pi/3$
B: $4\pi/3 \leq H_B < 5\pi/3$
M: $5\pi/3 \leq H_M < 2\pi$.

The distance computing section 12 computes a distance Doi from the achromatic color Lo* (generally 50–60) of each region to the chromaticity data stored in the first storage device 4 and those stored in the original data storage device 5 using Equation (4):

$$\text{Doi} = [(L^* - Lo^*)^2 + a^{*2} + b^{*2}]^{1/2} \quad (4)$$

where i=Red, Yellow, Green, Cyan, Blue and Magenta.

Then, the maximum distance between the chromaticity data stored in the first storage device 4 and the achromatic color Lo* in each region is found as $D_R, D_Y, \ldots, D_M$ using Equation (4) above. Likewise, the maximum distance between the chromaticity data stored in the original data storage device 5 and the achromatic color Lo* in each region is found as $D_{RS}, D_{YS}, \ldots, D_{MS}$ using Equation (4) above.

The compression ratio computing section 13 computes a ratio $R_i$ ($R_R = D_{RS}/D_R$, $R_Y = D_{YS}/D_Y$, ..., $R_M = D_{MS}/D_M$ of the maximum distances found using Equation (4) above. The Ri thus found is used as the compression ratio, and the data related to the compression ratio Ri are outputted to the compressing section 15.

The compressing section 15 compresses the chromaticity data of the original image based on the input data of the compression ratio Ri. Note that the chromaticity data are converted into another kind of data (HSL value) by the CIE L* a* b*—HSL converting section 14 using Equation (5) through (7) below before they are inputted into the compressing section 15.

$$H = \arctan(b^*/a^*) \quad (5)$$

$$S = \text{Sqrt}(a^{*2} + b^{*2}) \quad (6)$$

$$L = L^* \quad (7)$$

In other words, the compressing section 15 compresses luminosity (Lt*) and saturation (St*) of the converted chromaticity data (HSL value) to the compression ratio Ri using Equations (8) and (9) below. Note that hue (H) is left intact herein:

$$Lt^* = Ri \cdot L^* \quad (8)$$

$$St^* = Ri \cdot S \quad (9)$$

The HSL—CIE L* a* b* value converting section 16 receives the chromaticity data (HSt* Lt* value) composed of the compressed luminosity (Lt*) and saturation (St*) and the intact hue (H) from the compressing section 15, and converts the input chromaticity data into the CIE L* a* b* value using Equations (10) through (12) as follows:

$$L^* = L \quad (10)$$

$$a^* = S \cos H \quad (11)$$

$$b^* = S \sin H \quad (12)$$

Thus, the chromaticity data converting device 7 compresses the color reproducible region of the chromaticity data (L* a* b* value) from the first color converting device 2 in the directions of saturation and luminosity alone while leaving the color reproducible region in the direction of hue intact.

Therefore, the chromaticity data converting device 7 determines a compression ratio of the color gamut based on the chromaticity data within the color reproducible region of the image output device 10 stored in the second storage device 6 and the chromaticity data of the original image stored in the image data storage device 5. In short, the compression ratio is determined for each input image individually, so that the color gamut can be compressed in the best manner for each input image.

In addition, since the chromaticity data converting device 7 compresses the data related to saturation and luminosity of the chromaticity data of the original image and leaves the data related to hue intact, the copy image outputted from the image output device 10 can render the hue faithful to the input image, thereby making it possible to improve the quality of the copy image.

(II) Second Method

The second method will be explained with reference to FIGS. 7 and 8.

Figure 8:
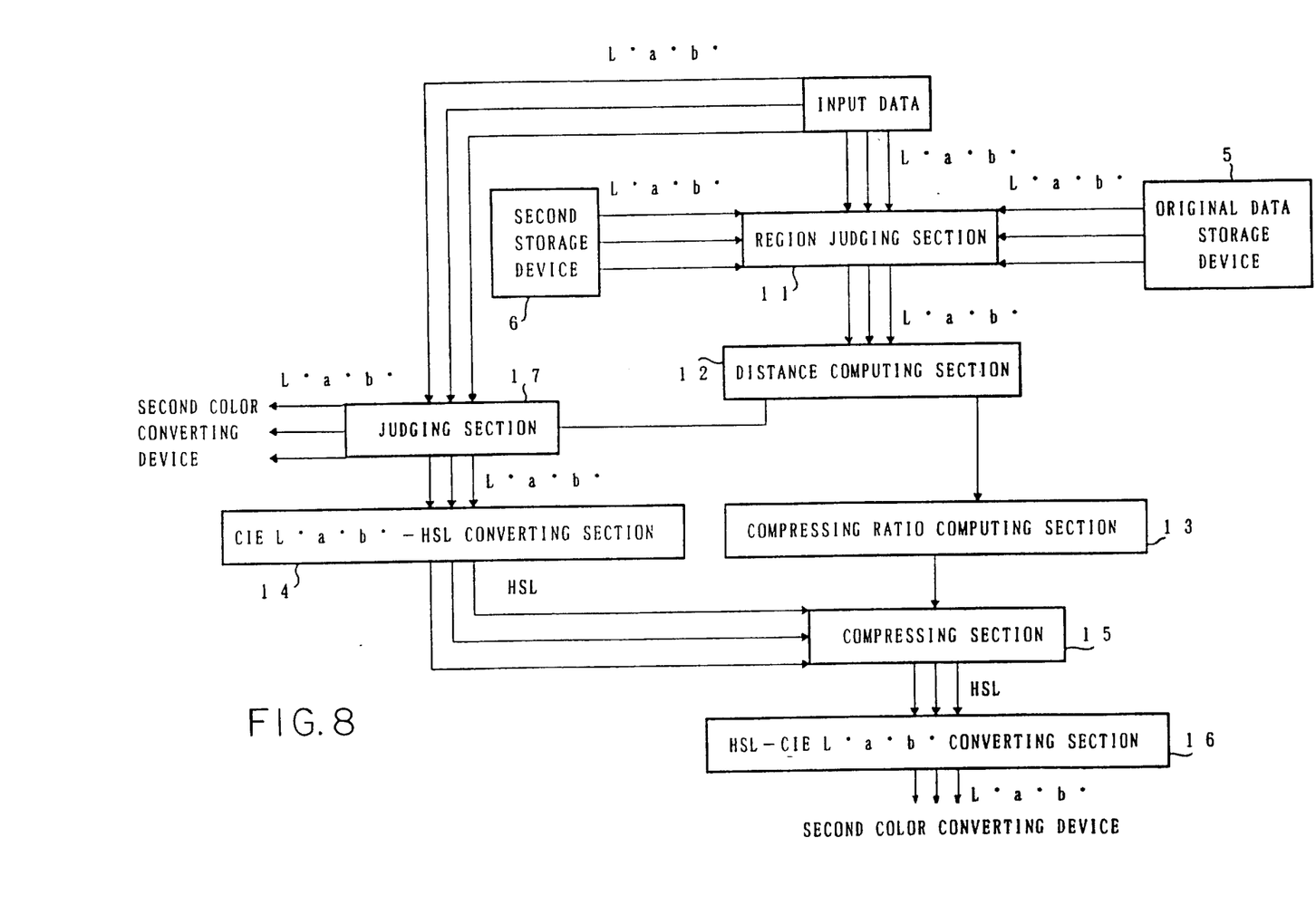
FIG. 8 is a view schematically showing another example chromaticity data converting device of the image processing device of FIG. 1.

The chromaticity data converting device 7 adopting the second method is of the same structure as the counterpart of FIG. 6 except that a judging section 17 is additionally included as shown in FIG. 8.

Like in the first method, the distance computing section 12 computes the distance Doi based on the chromaticity data of the color reproducible region of the image output device 10 stored in the second storage device 6 using Equation (4) above, and the distance D from the input chromaticity data to the achromatic color Lo* in each of the six regions shown in FIG. 7 also using Equation (4) above, and outputs the data related to both the distances Doi and D to the data judging section 17.

The judging section 17 judges whether the chromaticity data of the input image are within the color reproducible region of the image output device 10. To be more specific, the judging section 17 compares the input distance D with the input distance Doi, and when the former is larger than the latter, the judging section 17 judges that the chromaticity data of the input image are out of the color reproducible region, and judges otherwise when the former equals to the latter or the former is smaller than the latter.

When the judging section 17 judges that the chromaticity data of the input image are out of the color reproducible region of the image output device 10, the chromaticity data converting device 7 carries out the compression processing in the same manner as the first method by means of the compressing section 15. On the other hand, when the judging section 17 judges the chromaticity data of the input image data are within the color reproducible region of the image output device 10, the chromaticity data converting device 7 outputs the chromaticity data of the input image intact to the second color converting device 9.

As has been explained, in the second method, whether the chromaticity data of the input image should be compressed or not is determined depending on whether the chromaticity data of the input image are within the color reproducible region of the image output device 10 or not.

Since the chromaticity data of the input image are converted only when the same are out of the color reproducible region of the image output device 10, needless conversion of the chromaticity data can be eliminated.

Thus, not only the conversion processing of the chromaticity data can be accelerated, but also the degradation in image quality caused by the converting processing of the chromaticity data (lowering hue due to compression) can be suppressed. Thus, it has become possible to quickly produce a copy image which is faithful to the original image with the hue as bright as the original image.

(III) Third Method

The third method will be explained with reference to FIGS. 7 through 9.

Figure 9:
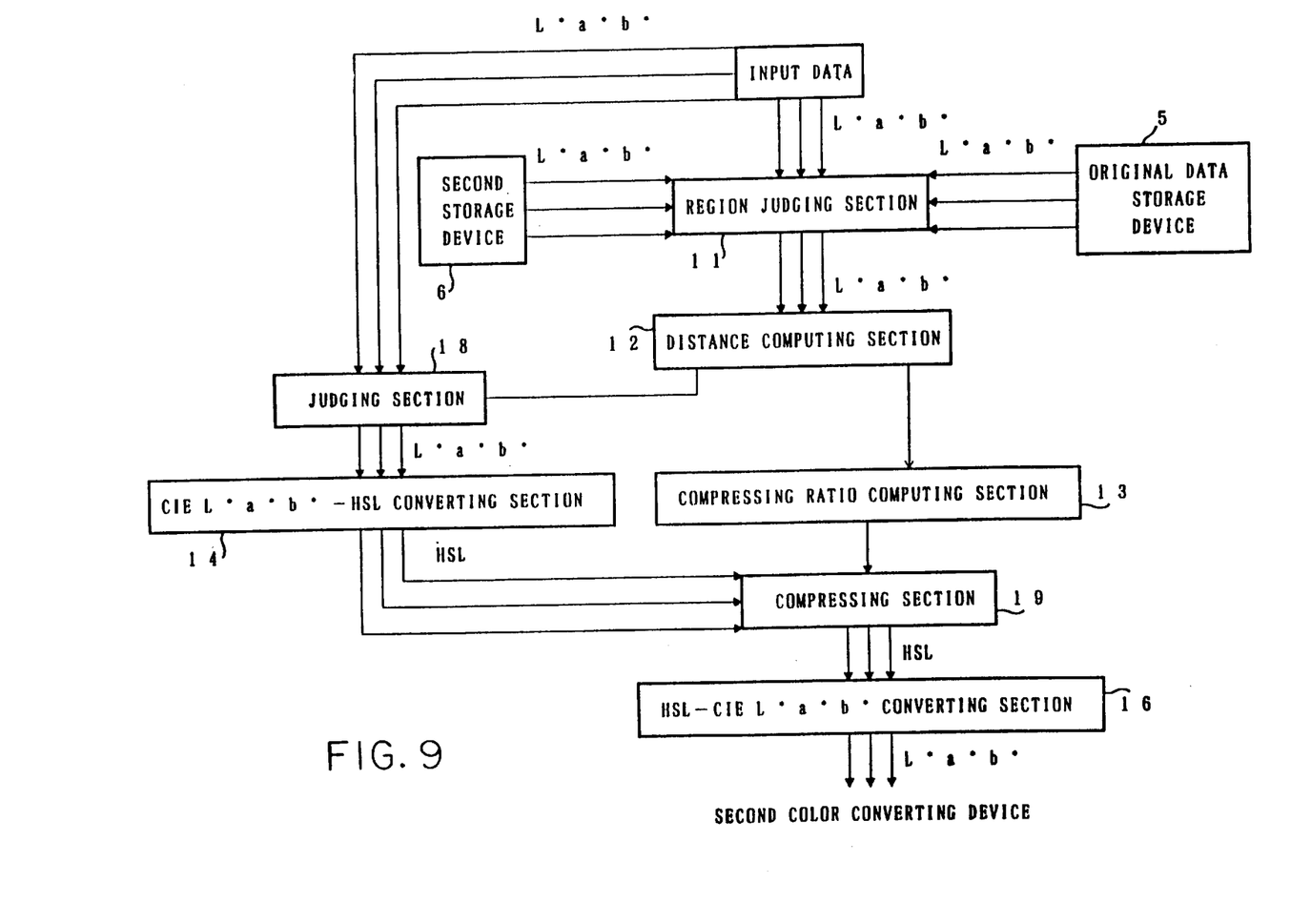
FIG. 9 is a view schematically showing a further example chromaticity data converting device of the image processing device of FIG. 1.

As shown in FIG. 9, the chromaticity data converting device 7 adopting the third method is of the same structure as the counterpart of FIG. 8 except that the judging section 17 is replaced with a judging section 18, and the compressing section 15 is replaced with a compressing section 19.

The judging section 18 judges whether the chromaticity data of the input image are within the color reproducible region of the image output device 10 in the same manner as the judging section 17 of the second method.

When the judging section 18 judges that the chromaticity data of the input image are out of the color reproducible region of the image output device 10, the compressing device 19 carries out the compression processing using Equations (8) and (9) above in the same manner as the first method. On the other hand, when the judging section 18 judges that the chromaticity data of the input image are within the color reproducible region of the image output device 10, the compressing device 19 carries out the compression processing using Equations (13) and (14):

$$Lt^* = K_1 \cdot R_i \cdot L^* \quad (13)$$

$$St^* = K_2 \cdot R_i \cdot S \quad (14)$$

Equation (13) is a compressing equation for luminosity and Equation (14) is a compressing equation for saturation. Note that the data related to hue are left intact as were in the first method.

As has been explained, in the third method, even when the input data of the original image are within the color reproducible region of the image output device 10, the input data are compressed by Equations (13) and (14) above. In other words, all the chromaticity data converted from the input color signal are subject to the compression processing herein; however, different processing equations are used depending on whether the chromaticity data are within the color reproducible region of the image output device 10 or not.

Therefore, in the third method, the chromaticity data converting device 7 carries out the compression processing to all the chromaticity data converted by the first color converting device 2. However, the compression processing is carried out using different processing equations depending on whether the chromaticity data are within the color reproducible region of the image output device 10 or not. Thus, the resulting copy image renders higher image quality compared with a case where all the chromaticity data are processed by the same processing equation(s).

As has been explained, the image processing apparatus of the present embodiment converts the chromaticity data depending on the input original image. Thus, the resulting copy image is more faithful to the original image compared with the conventional case where the chromaticity data of the original image are converted using the color reproducible region of the image output device and the chromaticity data of the color reproducible region of the input device.

In the present embodiment, the CIE L* a* b* color space is used as the color space for the explanation's convenience.

However, the color space is not limited to the CIE L* a* b* color space, and other color specification systems are also applicable as the color space. For example, using the Yxy color space and L* u* v* color space respectively adopted by CIE in 1931 and 1976 does not impair the effect of the present embodiment. Moreover, since the above L* a* b* color space, Yxy color space, and L* u* v* color space are relatively close to the color specification to which human eyes respond. Thus, using such a color space enables the first color converting device 2 to convert the data more accurately, thereby making it possible to obtain a high-quality copy image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:

image input means for pulling in image data of a color original image to produce a first color signal based on said image data, color signal processing means for processing the first color signal, and an image output device for outputting a processed signal from said color signal processing means as a color copy image, wherein said color signal processing means includes pre-scanning means for pulling in the image data of said original image by skipping every other scanning line to produce a second color signal, first color converting means for converting the first and second color signals into first chromaticity data generated from the color original image and second chromaticity data corresponding to the color original image, respectively, storage means for storing third chromaticity data of a color reproducible region of said image output device, original data storage means for storing the second chromaticity data corresponding to the color original image, chromaticity data converting means for converting the first chromaticity data generated from the color original image into fourth chromaticity data which can be outputted from said image output device, said conversion being carried out based on the third chromaticity data of the color reproducible region of said image output device stored in said storage means and the second chromaticity data corresponding to the color original image stored in said original data storage means, and second color converting means for converting the fourth chromaticity data, which is modified as a function of said color original images into a signal which can be outputted from said image output device, wherein said chromaticity data converting means judges whether the first chromaticity data are within a color reproducible region of said image output device, said chromaticity data converting means converting the first chromaticity data in different methods depending on whether the first chromaticity data are within the color reproducible region of said image output device or not.

2. The image processing apparatus as defined in claim 1, wherein said image input means also serves as said pre-scanning means.

3. The image processing apparatus as defined in claim 1, wherein said first color converting means converts the first and second color signals respectively into the first and second color chromaticity data based on a color signal and chromaticity data obtained from a sample color image.

4. The image processing apparatus as defined in claim 3, wherein said first color converting means converts the first and second color signals respectively into the first and second color chromaticity data using a color converting matrix produced with the color signal and chromaticity data obtained from the sample color image.

5. The image processing apparatus as defined in claim 4, wherein said color converting matrix is found by a multiple regression model.

6. The image processing apparatus as defined in claim 3, wherein said first color converting means converts the first and second color signals respectively into the first and second color chromaticity data using a 3-D look-up table, said 3-D look-up table being composed of a color space produced with the color signal and chromaticity data obtained from the sample color image.

7. The image processing apparatus as defined in claim 6, wherein, when chromaticity data corresponding to the input color signal are missing at a matching space coordinate of said 3-D look-up table, said first color converting means uses pre-stored chromaticity data of a nearby space coordinate to convert the first and second color signals into the first and second chromaticity data, respectively.

8. The image processing apparatus as defined in claim 3, wherein said first color converting means converts the first and second color signals respectively into the first and second color chromaticity data using a neural network that has learned the color signal and chromaticity data obtained from the sample color image.

9. The image processing apparatus as defined in claim 8, wherein said neural network learns using a back propagation algorithm.

10. The image processing apparatus as defined in claim 1, wherein said chromaticity data converting means compresses a color gamut of the first chromaticity data from said first color converting means in a direction of an achromatic color to a compression ratio, said compression ratio being obtained based on the third chromaticity data stored in said storage means and the second chromaticity data stored in said original data storage means.

11. An image processing apparatus, comprising:

image input means for pulling in image data of a color original image to produce a first color signal based on said image data, color signal processing means for processing the first color signal, and an image output device for outputting a processed signal from said color signal processing means as a color copy image, wherein said color signal processing means includes pre-scanning means for pulling in the image data of said original image by skipping every other scanning line to produce a second color signal, first color converting means for converting the first and second color signals into first chromaticity data generated from the color original image and second chromaticity data corresponding to the color original image, respectively, storage means for storing third chromaticity data of a color reproducible region of said image output device, original data storage means for storing the second chromaticity data corresponding to the color original image, chromaticity data converting means for converting the first chromaticity data generated from the color original image into fourth chromaticity data which can be outputted from said image output device, said conversion being carried out based on the third chromaticity data of the color reproducible region of said image output device stored in said storage means and the second chromaticity data corresponding to the color original image stored in said original data storage means, and second color converting means for converting the fourth chromaticity data, which is modified as a function of said color original image, into a signal which can be outputted from said image output device, and wherein said color converting means converts the first chromaticity data into the fourth chromaticity data only when the first chromaticity data are out of the color reproducible region of said image output device.

12. The image processing apparatus as defined in claim 1, wherein said second color converting means converts the fourth input chromaticity data into a signal which can be outputted by said image output device based on a color signal and chromaticity data obtained from a sample color image.

13. The image processing apparatus as defined in claim 12, wherein said second color converting means converts the fourth chromaticity data into the signal which can be outputted from said image output device based a color converting matrix, said color converting matrix being produced based on the color signal and chromaticity data obtained from the sample color image.

14. The image processing apparatus as defined in claim 13, wherein said color converting matrix is found by a multiple regression model.

15. The image processing apparatus as defined in claim 12, wherein said second color converting means converts the fourth chromaticity data into the signal which can be outputted from said image output device using a 3-D look-up table, said 3-D look-up table being composed of a color space produced based on the color signal and chromaticity data obtained from the sample color image.

16. The image processing apparatus as defined in claim 15, wherein, when chromaticity data corresponding to the input color signal are missing at a matching space coordinate of said 3-D look-up table, said second color converting means uses pre-stored chromaticity data of a nearby space coordinate to convert the fourth chromaticity data into said signal which can be outputted from said image output device.

17. The image processing apparatus as defined in claim 12, wherein said second color converting means converts the fourth chromaticity data into the signal which can be outputted from said image output device using a neural network that has learned the color signal and chromaticity data obtained from the sample color image.

18. The image processing apparatus as defined in claim 17, wherein said neural network learns using a back propagation algorithm.

* * * * *